(12) United States Patent
Carabelli et al.

(10) Patent No.: US 7,942,225 B2
(45) Date of Patent: May 17, 2011

(54) SUSPENSION SYSTEM FOR A WHEELED VEHICLE AND A WHEELED VEHICLE EQUIPPED WITH SUCH A SUSPENSION SYSTEM

(75) Inventors: Stefano Carabelli, Cesana Torinese (IT); Andrea Tonoli, Avigliana (IT); Andrea Festini, Collegno (IT); Fabio Cavalli, Alessandria (IT); Nicola Amati, Cisternino (IT)

(73) Assignee: Fondazione Torino Wireless, Turin (IT)

( * ) Notice: Subject to any disclaimer, the term of this patent is extended or adjusted under 35 U.S.C. 154(b) by 471 days.

(21) Appl. No.: 11/827,338

(22) Filed: Jul. 11, 2007

(65) Prior Publication Data

US 2008/0257626 A1   Oct. 23, 2008

(30) Foreign Application Priority Data

Jul. 13, 2006   (EP) ..................................... 06014608

(51) Int. Cl.
*B60K 6/22* (2007.10)
(52) U.S. Cl. ..................... 180/165; 180/65.1; 180/65.31
(58) Field of Classification Search .................. 180/165, 180/65.1, 65.31
See application file for complete search history.

(56) References Cited

U.S. PATENT DOCUMENTS

| | | | | | |
|---|---|---|---|---|---|
| 3,921,746 | A | * | 11/1975 | Lewus | 180/165 |
| 4,024,926 | A | * | 5/1977 | Butoi | 180/65.245 |
| 5,091,679 | A | * | 2/1992 | Murty et al. | 318/153 |
| 5,296,785 | A | * | 3/1994 | Miller | 318/254.1 |
| 5,337,560 | A | * | 8/1994 | Abdelmalek | 60/370 |
| 5,570,286 | A | * | 10/1996 | Margolis et al. | 701/36 |
| 2004/0113377 | A1 | * | 6/2004 | Klees | 280/5.514 |
| 2004/0206561 | A1 | * | 10/2004 | Song et al. | 180/165 |

FOREIGN PATENT DOCUMENTS

| DE | 39 37 987 | 5/1991 |
|---|---|---|
| GB | 2 396 340 | 6/2004 |
| WO | WO 90/08670 | 8/1990 |

* cited by examiner

*Primary Examiner* — J. Allen Shriver, II
*Assistant Examiner* — Bryan A Evans
(74) *Attorney, Agent, or Firm* — Fattibene and Fattibene, LLP; Paul A. Fattibene

(57) ABSTRACT

A suspension system for a wheeled vehicle is provided, the suspension system being adapted to support at least one wheel of the vehicle and comprising at least one shock absorbing device adapted to be activated as a result of the motion of the at least one wheel in a substantially vertical direction, the suspension system further comprising electrical power generating means in fluid connection with the at least one shock absorbing device so that the activation of said at least one shock absorbing device results in electrical power being generated. Furthermore, the suspension system comprises means for absorbing at least partially the electrical power generated, the absorption of electrical power resulting in the stiffness of said at least one shock absorbing device being varied as a function of the electrical power absorbed.

11 Claims, 5 Drawing Sheets

SUSPENSION SYSTEM FOR A WHEELED VEHICLE AND A WHEELED VEHICLE EQUIPPED WITH SUCH A SUSPENSION SYSTEM

FIELD OF THE PRESENT INVENTION

The present invention relates to the field of automotive applications. In particular, the present invention relates to a suspension system or module for wheeled vehicles and a wheeled vehicle equipped with such a suspension system or module. In more detail, the present invention relates to a suspension system or module adapted to support at least one wheel of a vehicle so as to adequately absorb shocks to which the at least one wheel may be subjected, for instance when crossing a bump or the like. Moreover, the present invention relates to a suspension system equipped with a shock absorbing device, wherein, during vertical displacement of the at least one wheel, the stiffness of the shock absorbing device may be actively varied according to the circumstances, such as, for instance, the driving conditions and/or as a result of driver commands. Still in more detail, the present invention relates to a suspension system or module, wherein the shock absorbing device may be used as an actuating device adapted to actuate electrical power generating means, and wherein means for absorbing at least partially the electrical power generated are provided, so that the behavior of the shock absorbing device may be actively varied or modified as a function of the electrical power absorbed.

DESCRIPTION OF THE PRIOR ART

The suspension system has represented an essential part of an automobile and/or other vehicles since the beginning of the automotive industry. Suspension systems serve a dual purpose, contributing to the cars handling and braking for good active safety and driving pleasure and keeping vehicle occupants comfortable and reasonably well isolated from road noise, bumps, vibrations or the like. Additionally, the suspension system also protects the vehicle itself and any cargo or luggage from damage and wear.

Common suspension systems comprise both springs and dampers or shock absorbers. The springs are used to absorb impacts while the shock absorbers are used to control spring motions. In particular, the shock absorbers are used to damp out the, otherwise resonant, up and down motions of a vehicle on its springs. They also must damp out much of the wheel bounce when the unsprung weight of a wheel, hub, axle and sometimes brakes and differential bounces up and down on the springiness of a tire.

However, developing suspension systems offering adequate performances has revealed to be a very difficult task for the car manufacturers. In particular, this is due to the fact that the damping rate and stiffness of the suspension system drastically influences both safety and comfort of the vehicle. On one hand, suspension systems with a low damping and stiffness offer driving pleasure and comfort and are, therefore, preferably used for "normal" vehicles, while on the other hand suspension systems with increased damping and stiffness allow improvement in the cars handling and are, therefore, preferably used for racing cars. Accordingly, many efforts have been dedicated by the car manufacturers to the development of suspension systems offering a reasonable compromise between comfort and handling. In particular, great attention has been given to the development of suspension systems, the stiffness of which may be varied according to driving and/or road conditions or on a driver's commands.

Suspension systems of these kinds are generally referred to as semi-active or active suspension systems. Semi-active suspension systems comprise devices such as air springs and switchable shock absorbers, along various self-leveling solutions as well as systems like hydropnuematic and hydrogas suspensions. Fully active suspension systems use electronic monitoring of vehicle conditions, coupled with means to act on the suspensions with a force able to work actively on the vehicle suspension so as to transfer a mechanical work to it. This is done in real time to directly control the motion of the car.

However, in spite of all the advantages offered by active and semi-active suspension systems of the kind known in the art, these suspensions systems are still affected by several drawbacks. In particular, the first very important disadvantage affecting the known suspension systems relates to the fact that the damping value or stiffness of these suspension systems may not be varied continuously. Moreover, a further drawback affecting prior art suspension systems relates to the mechanical complexity and the small improvement in the driving performances and drive feeling that they allow under normal driving conditions so that their use is limited to high-end vehicles where higher costs may be justified. Another drawback affecting both active and semi-active prior art suspension systems relates to the fact that these systems require very complicated electronic control devices. Moreover, mechanical prior art suspension systems require a lot of space so that an ideal layout of the overall vehicle is quite often not possible. Apart from complexity and the related costs the main drawback of the active suspensions is the amount of mechanical power they require from the vehicle engine. The peak power required under certain circumstances by the active suspensions could reduce considerably the power available for the vehicle motion. An additional drawback of active solutions is the weight added to the vehicle and the need of a complex system to link the actuators installed in each suspension to the main power generation element usually installed as an accessory of the vehicle engine.

SUMMARY OF THE INVENTION

Accordingly, in view of the problems and/or drawbacks identified above, it is an object of the present invention to provide a suspension system or module allowing to overcome the drawbacks affecting the prior art suspension systems, namely both the semi-active and active prior art suspension systems.

Moreover, it is an object of the present invention to provide a suspension system allowing to adequately and continuously vary the damping value or stiffness.

Still a further object of the present invention is that of providing a suspension system with reduced complexity.

Another object of the present invention is that of providing a suspension system offering an adequate compromise between cars handling and driving pleasure or comfort.

Still a further object of the present invention is that of providing a suspension system with no or few mechanical links, thus allowing optimizing of the packaging of the suspension system in a vehicle resulting in an improved layout of the overall vehicle.

A further object of the present invention is that of providing a suspension system, the overall mass of which is less than that of a mechanical suspension system.

Finally, a further object of the present invention is that of providing a suspension system wherein less friction arises than in a mechanical suspension system.

To this end, according to the present invention, this is obtained by providing a suspension system adapted to support at least one wheel of a vehicle and comprising shock absorbers coupled with electrical power generating means so that the shocks to which the wheel is subjected are used to generate electrical power and wherein the behavior of the shock absorbers may be varied as a function of the electrical power collected and/or dissipated. In other words, the possibility to generate electrical power and to collect and/or dissipate at least partially the electrical power generated allows control of the stiffness of the shock absorbers, thus obtaining the functionality of an active suspension system. Moreover, the electrical power absorbed may be easily controlled by means of controlling equipment so that neither additional mechanical links nor other complex equipments are required. Furthermore, the stiffness of two or more shock absorbers, for instance the two shock absorbers supporting wheels disposed on a common axle of the vehicle, may be controlled contemporarily, thus obtaining the function of a suspension system, wherein the wheels on a common axle behave the same way. Alternatively, the stiffness of each shock absorber of the vehicle may be controlled independently and separately, thus achieving the function of a fully independent suspension system, wherein each wheel behaves independently without affecting the other wheels of the vehicle. Moreover, and especially in those cases in which an electric motor is used for the purpose of generating electrical power, this electric motor may also be supplied with electrical power resulting in the possibility to also actuate the shock absorbers, thus obtaining the functionality of a fully active suspension system.

In particular, according to a first embodiment of the present invention, these goals are obtained by means of a suspension system, namely a suspension system for a wheeled vehicle, with the suspension system being adapted to support at least one wheel of the vehicle and comprising at least one shock absorbing device adapted to be activated as a result of the motion of the at least one wheel in a substantially vertical direction. The suspension system further comprises electrical power generating means in fluid connection with the at least one shock absorbing device so that the activation of the at least one shock absorbing device results in electrical power being generated.

According to a further embodiment of the present invention, a suspension system is provided, namely a suspension system further comprising means for absorbing and/or dissipating at least partially the electrical power generated, the absorption of electrical power resulting in the stiffness of the at least one shock absorbing device being varied as a function of the electrical power absorbed.

According to still a further embodiment of the present invention, a suspension system is provided, namely a suspension system wherein the electrical power generating means further comprise at least one electrical motor adapted to be activated as a result of the activation of the at least one shock absorbing device.

According to another embodiment of the present invention, a suspension system is provided, namely a suspension system wherein the at least one electric motor is adapted to be electrically activated, and in that electrical activation of the at least one electric motor results in the at least one shock absorbing device being activated through the at least one electric motor.

According to a further embodiment of the present invention, a suspension system is provided, namely a suspension system wherein the electrical power generating means further comprise at least one fluid machine in fluid connection with both the at least one shock absorbing device and the at least one electric motor so that activation of the at least one shock absorbing device as a result of the motion of the at least one wheel in a substantially vertical direction results in the fluid machine being also activated through a fluid and in the at least one electric motor being activated through the at least one fluid machine.

According to still a further embodiment of the present invention, a suspension system is provided, namely a hydraulic suspension system wherein the fluid machine comprises at least one hydraulic reversible pump.

According to still another embodiment of the present invention, a suspension system is provided, namely a suspension system adapted to support at least a first wheel and a second wheel, and comprising at least a first shock absorbing device adapted to be activated as a result of the motion of the at least first wheel and at least a second shock absorbing device adapted to be activated as a result of the motion of the at least second wheel, the system comprising first and second electrical power generating means in fluid connection with the first and second shock absorbing devices, respectively, so that the activation of one or both of the first and second shock absorbing means results in electrical power being generated.

According to still another embodiment of the present invention, a suspension system is provided, namely a suspension system wherein the first electrical power generating means comprise a first electric motor adapted to be activated as a result of the activation of the first shock absorbing device, and wherein the second electrical power generating means comprise a second electric motor adapted to be activated as a result of the activation of the second shock absorbing device.

According to still a further embodiment of the present invention, a suspension system is provided, namely a suspension system wherein the first electrical power generating means further comprise at first fluid machine in fluid connection with both said first shock absorbing device and the at least one electric motor so that activation of the first shock absorbing device as a result of the motion of the first wheel in a substantially vertical direction results in the first fluid machine being also activated through a fluid and in the first electric motor being activated through the first machine, and wherein the second electrical power generating means further comprise a second fluid machine in fluid connection with both the second shock absorbing device and the second electric motor so that activation of the second shock absorbing device as a result of the motion of the second wheel in a substantially vertical direction results in the second fluid machine being also activated through a fluid and in the second electric motor being activated through the second fluid machine.

Finally, according to still another embodiment of the present invention, a wheeled vehicle is provided, namely a wheeled vehicle comprising at least one wheel, wherein the at least one wheel is supported by a suspension system according to one of the prior embodiments.

Further embodiments, features and/or details of the present invention are more fully defined below.

BRIEF DESCRIPTION OF THE DRAWINGS

In the following, a description will be given with reference to the drawings of particular and/or preferred embodiments of the present invention; it has, however, to be noted that the present invention is not limited to the embodiments disclosed but that the embodiments disclosed only relate to particular examples of the present invention, the scope of which is defined by the appended claims. In particular, in the drawings:

DETAILED DESCRIPTION OF THE PREFERRED EMBODIMENTS

Figure 1:
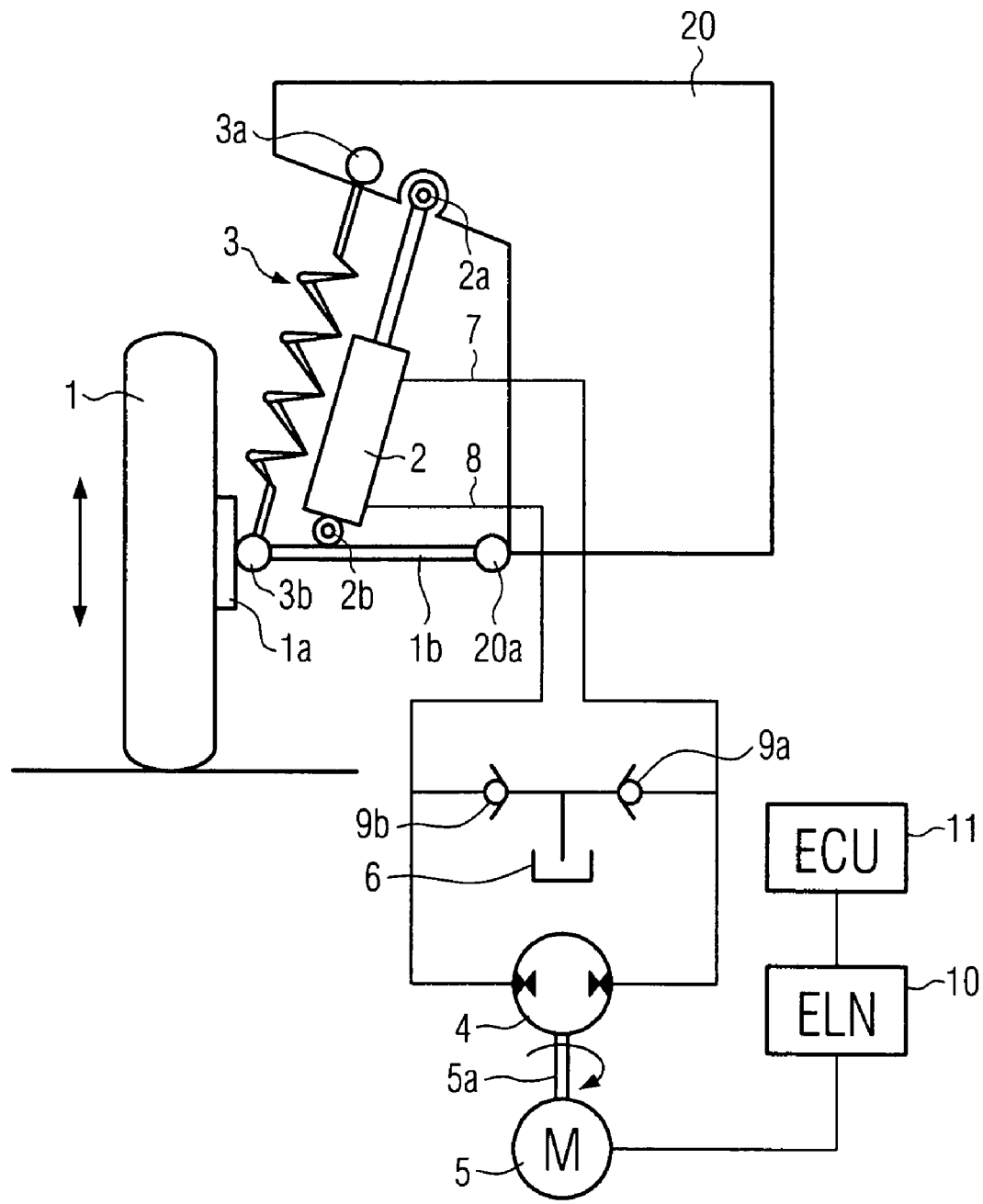
FIG. 1 relates to a schematic view of a first embodiment of the suspension system or module according to the present invention.

While the present invention is described with reference to the embodiments as illustrated in the following detailed description as well as in the drawings, it should be understood that the following detailed description as well as the drawings are not intended to limit the scope of the present invention to the particular illustrative embodiments disclosed, but rather the described illustrative embodiments merely exemplify the various aspects of the present invention, the scope of which is defined by the appended claims.

As apparent from the disclosure given above, the present invention is understood to be particularly advantageous when used for applications in the automotive field; in particular, the present invention is understood to be particularly advantageous when implemented in wheeled vehicles for the purpose of supporting the wheels of the vehicle and adequately absorbing the shocks to which the wheels are subjected during driving. For this reason, examples will be given in the following in which corresponding embodiments of the suspension systems according to the present invention are described in combination with the wheels and/or other component parts of a wheeled vehicle. However, it has to be noted that the possible implementations of the present invention are not limited to the particular case of wheeled vehicles; on the contrary, the present invention is adapted to be used in any other situation in which reciprocating means are used as supporting means and in which the need arises of actively controlling either the reciprocating speed or the stiffness of the reciprocating means. In particular, the present invention is also adapted to be implemented in all situation in which shocks have to be absorbed and in which the shock absorbing functions need to be actively controlled. For instance, the present invention is also adapted to be implemented in equipments which have to be resiliently supported, for instance equipments that generate oscillations while working, so that the need arises to absorb these oscillations. Accordingly, it will become apparent form the following disclosure that the present invention may also be used for other applications, in particular for other automotive applications, for instance for the purpose of actively absorbing the vibrations generated by the driving engine. It has, therefore, to be understood that the present invention is adapted to be used for actively absorbing any kind of vibration and not only the shocks to which the wheels of a vehicle are subjected while driving.

The present invention is based on the consideration that if shock absorbing means are used for the purpose of supporting equipments, the reciprocating motion of these shock absorbing means arising as a consequence of the vibrations and/or shocks relating to this equipment, for instance the vibrations generated by an engine or machinery while working or the shocks to which a wheel is subjected while driving, may be used for the purpose of generating electrical power. In particular, the present invention is based on the principle that if the electrical power as generated is at least partially dissipated and/or absorbed then the reciprocating motion of the shock absorbing means may be adequately controlled. In more detail, the present invention is based on the consideration that if an electric motor is activated as a result of the reciprocating motion of the shock absorbing means, then the electric motor may be used as a damper. The means that transforms the reciprocating motion of the shock absorbing means into the rotational motion of the electric motor is a sort of transmission, or gearbox. In fact, if the linear reciprocating motion of the shock absorbing means is transformed into the rotary motion of the rotor of an electric motor, then the torque exerted by the motor against the rotation of its rotor may be transformed into the force needed to damp out the shock absorbing means. Moreover, this force can be controlled by controlling the electrical power and/or current generated by the motor working as a generator, resulting in the possibility of adequately controlling the damping function of the shock absorbing means. In fact, if the electrical power or current generated by the electric motor is at least partially dissipated and/or collected, the friction exerted by the electric motor against the rotation imposed to the rotor by the reciprocating motion of the shock absorbing means may be varied as a function of the electrical power or current dissipated and/or collected. Accordingly, both the reciprocating speed and the stiffness of the shock absorbing means may also be varied as a function of the electrical power or current absorbed and or dissipated, thus resulting in the possibility to actively control this reciprocating speed or stiffness or, in other words the function of the shock absorbing means. The way the linear reciprocating motion of the shock absorbing means is transformed into the rotary motion of the rotor of the electric motor may be varied according to the circumstances; for instance, to this end, a fluid machine, for instance, a hydraulic machine, may be interposed between the shock absorbing means and the electric motor, with this fluid machine being in fluid connection with the shock absorbing means and adapted to be activated by the shock absorbing means through a fluid, the activation of this fluid machine resulting in the electric motor also being rotated. In this case, no additional equipment is needed for the purpose of controlling the damping function of the shock absorbing means such as, for instance proportional valves or the like. On the contrary, as stated above, the damping function may be directly and actively controlled by controlling the absorption of the electrical current or power generated by the electric motor working as a generator. For instance, variable resistors, i.e. resistors allowing their resistance value to be varied (e.g. potentiometers) may be used in combination with the electric motor so that the electrical power absorbed directly depends on the resistance value; accordingly, also the damping function of the shock absorbing means may be controlled by controlling the resistance value of the potentiometer.

In the following, with reference to FIG. 1, a first embodiment of the suspension system or module according to the present invention will be described.

In FIG. 1, reference 20 identifies a vehicle or a part of it, such as, for instance, the chassis of a car. The vehicle 20 comprises a wheel 1 mechanically connected to the chassis through a suspension arm 1b, for instance a wishbone arm; the suspension arm 1b is connected to the chassis of the vehicle 20 through a pivotable connection 20a, allowing the wheel 1 to be reciprocated in the direction of the arrow, in a direction substantially vertical, during driving, for instance when crossing bumps or the like. A driving motor 1a, for instance an electric motor, is received in the hub of the wheel 1 so that the driving torque needed for driving or rotating the wheel 1 is obtained through electrical actuation of the electric motor 1a, by supplying electrical current to the electric motor 1a; alternatively, a main engine, for instance a combustion engine, not depicted in FIG. 1, may be provided for the purpose of driving the wheel 1. In this case, the wheel 1 is mechanically coupled to the main engine through transmission means such as a mechanical or electromechanical differential of the like, also not depicted in FIG. 1. A spring 3 is pivotally interposed between the chassis of the vehicle 20 and the suspension arm 1b; in particular, as depicted in FIG. 1, the first end portion of the spring 3 is connected to the chassis of the vehicle 20 through a first pivotable connection 3a while a second end portion of the spring 3, opposed to the first end portion, is pivotally connected to the suspension arm 1b through a second pivotable connection 3b. In the same way, a shock absorbing device 2 is interposed between the chassis of the vehicle 20 and the suspension arm 1b; moreover, a first end portion of the shock absorbing device is pivotally connected to the chassis of the vehicle 20 through a first pivotable connection 2a, while a second end portion of the shock absorbing device 2, opposed to the first end portion, is pivotally connected to the suspension arm 1b through a second pivotable connection 2b. According to the circumstances, the shock absorbing device 2 may comprise a cylinder, such as, for instance a hydraulic cylinder, an air or gas cylinder or the like. The spring 3 is provided for the purpose of supporting the static weight of the car that loads the suspension, and absorbing impacts and/or shocks to which the wheel 1 may be subjected such as, for instance shocks arising when crossing a bump or the like while driving. The shock absorbing device 2 is provided for the purpose of controlling the motion of the spring 3 so as to damp out the otherwise resonant motions of the vehicle 20 up and down on the spring 3. The shock absorbing device 2 is in fluid connection with a fluid machine 4 through pipes 7 and 8 connecting the input portions of the shock absorbing device 2 and the fluid machine 4, as well as the output portions of the shock absorbing device 2 and the fluid machine 4, respectively. The fluid machine 4 may comprise a hydraulic pump, for instance a fixed displacement hydraulic pump, an air or gas pump or the like. In those cases in which a hydraulic pump is preferred, a hydraulic cylinder is also provided as shock absorbing device 2. In light of the present invention, the fluid machine 4 is a machine adapted to be actuated, for instance rotated by a fluid flowing through the pipes 7 and 8 as a result of the motion of the wheel 1 in a substantially vertical direction, identified by the arrow in FIG. 1. The fluid machine 4 is mechanically coupled to electrical power or current generating means 5, for instance an electric motor working as a generator. That is, an actuation of the fluid machine 4 as a result of the vertical motion of the wheel 1, resulting in the shock absorbing device also being actuated so that a fluid flows through the pipes 7 and 8, results in the electrical power generating means 5 also being actuated, for instance the rotor of the electric motor or electrical power generating means 5 being rotated. The electrical power generating means 5 are connected to a power electronic unit 10 labeled ELN, which is in turn controlled by an electronic control unit 11 labeled ECU. It will become more apparent from the following disclosure that the power electronic unit 11 is provided for the purpose of at least partially absorbing or dissipating the electrical power or current generated by the electrical power or current generating means 5. To this end, the power electronic unit 10 may comprise variable resistors (e.g. potentiometers) or synthesized resistances or the like. The aim of the electronic control unit 11 is that of controlling the function of the power electronic unit 10, for instance modulating the potentiometers of the power electronic unit 10. Finally, two check valves 9a and 9b are provided for the purpose of compensating the unavoidable leakages of fluid from the circuit so as to ensure maintenance of the needed level of fluid in the reservoir 6, as well as the needed pressure in the overall circuit. In an alternative embodiment a pressurized accumulator could be used instead of the reservoir to avoid cavitation of the hydraulic pump.

In the following and still with reference to FIG. 1, the operation of the suspension system or module depicted therein will be described. In particular, in the following disclosure, it will be assumed for the sake of convenience that the shock absorbing device 2 comprises a hydraulic cylinder and that the fluid machine 4 comprises a hydraulic machine such as, for instance a hydraulic pump. Accordingly, it will also be assumed that the reservoir 6 is for containing a hydraulic fluid such as oil or the like, that the pipes 7 and 8 are hydraulic pipes and that the check valves 9a and 9b are hydraulic check valves. However, as stated above, the following disclosure also applies to other shock absorbing devices, fluid machines and pipes such as, for instance pneumatic shock absorbing devices, air or gas pumps and pipes for gas, air or the like.

During operation, the reciprocating motion of the wheel 1 arising during driving, for instance when crossing bumps or the like, but in the same way, also the oscillations of the chassis of the vehicle 20 due for instance to the main driving engine or arising when loading the vehicle, is transmitted to the hydraulic cylinder 2 which is, therefore, also reciprocated up and down in a substantially vertical direction. The cylinder 2 is connected by means of the hydraulic circuit, the hydraulic pipes 7 and 8, to the hydraulic machine 4, which, therefore, works as a hydraulic motor that, accordingly, drives the electric motor 5 through the connection 5a. In particular, in light of the present invention, driving the electric motor 5 may be understood as meaning that the rotor of the electric motor 5 is rotated. Accordingly, the electric motor 5 works as a generator, that is, electrical power or current is generated. It results, therefore, that a resistance is exerted by the electric motor 5 against the rotational motion transmitted by the hydraulic pump 4. Accordingly, a corresponding resistance is exerted by the hydraulic pump 4 and the hydraulic fluid in the pipes 7 and 8 against the reciprocating motion of the hydraulic cylinder 2. In other words, the hydraulic cylinder is not freely reciprocated up and down as it would be the case if this hydraulic cylinder 2 would not be hydraulically connected to the hydraulic pump and the electric motor 5. On the contrary, the reciprocating speed and the stiffness of the hydraulic cylinder 2 depends on the resistance exerted by the hydraulic pump 4 in combination with the electric motor 5. Moreover, this resistance is related to the resistance encountered by the rotor of the motor 5, which in turn depends on the way the motor is controlled or driven by the power electronic unit 10 and the electronic control unit 11. In particular, this resistance depends on that portion of the electrical power or current generated by the electric motor 5 which is dissipated or absorbed by means of the power electronic unit 10 and the electronic control unit 11. By varying the setting of the power control unit 10, the value of electrical current absorbed or dissipated may be varied, which in turn results in the resistance exerted by the motor 5 also being varied and, therefore, in the reciprocating speed and/or stiffness of the hydraulic cylinder 2 being also varied, accordingly. The macroscopic effect is, therefore, that the system operates as a viscous damper.

Additional details as on the way electrical current or power may be adequately absorbed and or dissipated will be given in the following with reference to FIGS. 3a, 3b and 4; at present it may be said that the system depicted in FIG. 1 eliminates any need of servo valves in the hydraulic circuit. The reason for that is that the link between the hydraulic cylinder 2 and the hydraulic machine or pump 4 is direct so that the rotation of the motor 5 is, therefore, a direct function of the wheel 1 movement, meaning that the hydraulic suspension system works like a mechanical gearbox.

Of course, sensing means may be provided, for instance in the electronic control unit 11, adapted to collect data relating to the driving conditions and/or the dynamic behavior of the vehicle 20. Accordingly, the function of the electric motor 5, the absorption of electrical current or power, may be controlled by the electronic control unit 11 through the power electronic unit 10 as a function of the data collected, thus allowing the function of the shock absorbing device 2 to be adapted to said driving conditions and/or behavior of the vehicle. In the same way, the function of the electric motor 5, in particular, the absorbing of electrical current or power, may be controlled on driver commands through the electronic control unit 11 and the power electronic unit 10.

In the following, with reference to FIGS. 3a and 3b corresponding examples of equipments will be described, adapted to absorb or dissipate at least partially the electrical current or power generated by the electric motor 5 and, therefore, adapted to be implemented in the suspension system according to the present invention. In FIGS. 3a and 3b, like features already described with reference to previous figures are identified by like reference numerals.

Figure 3A:
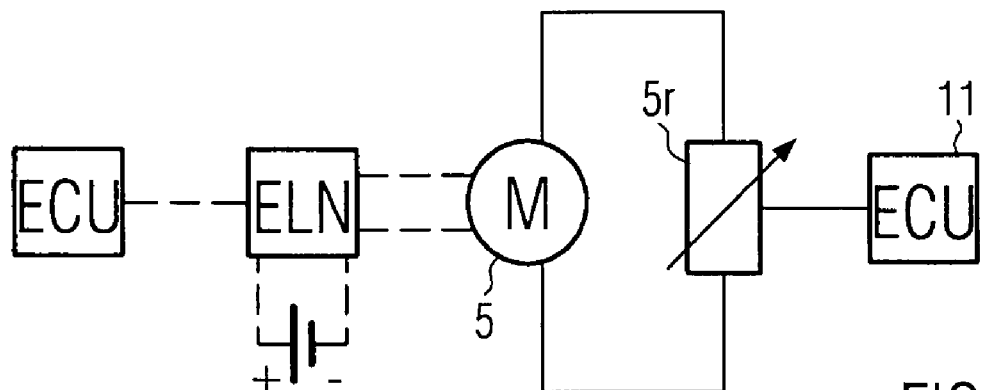
FIG. 3a relates to a schematic view of the electrical layout of electrical power generating and absorbing means adapted to be implemented in the suspension system according to the present invention.

In particular, in FIG. 3a, reference numeral 5r identifies a variable resistor (e.g. a potentiometer), i.e. a resistor the resistance of which may be varied and/or controlled. The solution or embodiment depicted in FIG. 3a comprising a single potentiometer or variable resistor 5r is suitable for use in those cases in which a direct current electric motor 5 is preferred. In the embodiment of FIG. 3a, the resistance of the resistor 5r may be varied under control of the electronic control unit 11, for instance, as stated above, depending on the driving conditions or the behavior of the vehicle or even according to commands of the driver. Varying the resistance of the resistor 5r results in the electrical current or power dissipated or absorbed by the resistor 5r also being varied, accordingly. In particular, if the resistance of the resistor 5r is increased, less electrical current flows through said resistor 5r; accordingly, less resistance, resulting in less torque, is exerted by the electric motor 5 against the rotation of the rotor of the motor 5 due to the action of the hydraulic pump 4, not depicted in FIG. 3a. Accordingly, the stiffness or damping function of the shock absorbing device 2, also not depicted in FIG. 3a, is also decreased. To the contrary, when the resistance of the resistor 5r is decreased under the control of the electronic control unit 11, the resistance or torque exerted by the electric motor 5 against the rotation of its rotor is increased, resulting in the stiffness or damping function of the hydraulic cylinder 2 also being increased. It results, therefore, that the stiffness or damping function of the hydraulic cylinder 2, and, therefore, of the overall suspension system, is a function of the actual value of resistance of the resistor 5r, so that the value of damping applied by the hydraulic cylinder 2 to the suspension system can be varied by varying or modifying the resistance of the resistor 5r.

Figure 3B:
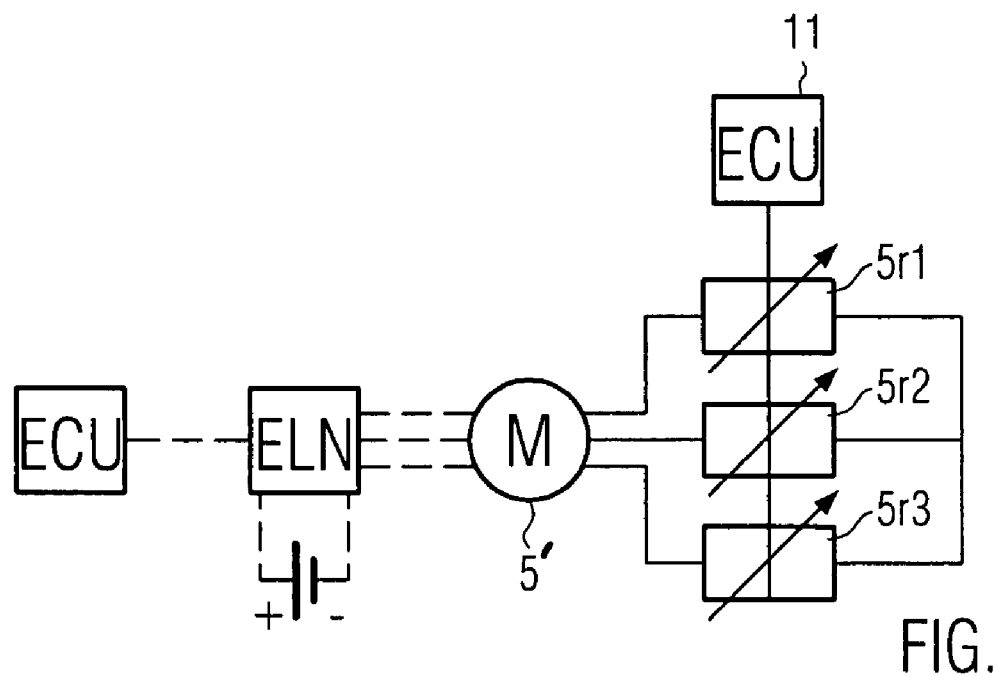
FIG. 3b relates to a schematic view of the electrical layout of further electrical power generating and absorbing means adapted to be implemented in the suspension system or module according to the present invention.

When a three phases electric motor 5' is preferred, for instance a brushless three phases electric motor, the layout depicted in FIG. 3b may be implemented. In this case, three variable resistors (e.g. three potentiometers) 5r1, 5r2 and 5r3 are provided with these variable resistors 5r1, 5r2 and 5r3 being shunted to the connectors of the motor 5. Again, the values of resistance of the potentiometers 4r1, 5r2 and 5r3 may be varied or modified under control of the electronic control unit 11; the damping function or stiffness of the shock absorbing device or hydraulic cylinder 2 depicted in FIG. 1 may therefore be varied at will by opportunely driving the potentiometers 5r1, 5r2 and 5r3.

In both the examples depicted in FIGS. 3a and 3b, it is also possible to make the system work in active and/or regenerative mode. In particular, as depicted in both FIGS. 3a and 3b, it is possible to apply a voltage to the motor 5 and 5' windings, for instance under control of an additional electronic control unit, driving a further power electronic unit ELN connected to a battery pack, as represented by dashed lines, so as to use the motor 5 as an actuator. In this case, the hydraulic machine 4 of FIG. 1 works as a pump applying a pressure difference between the pipes 7 and 8 and, therefore, applying a force to the hydraulic cylinder 2, in this case, a double effect hydraulic cylinder. Accordingly, the suspension system of FIG. 1 works as a real active suspension system, meaning that the setting of the suspension system may be actively varied and adapted in real time to the behavior of the vehicle or to the driving conditions. In particular, this can be obtained by adequately monitoring the vehicle and/or driving conditions.

In the following, with reference to FIG. 4, the electrical layout of further electric and/or electronic equipments adapted to be implemented in the suspension system according to the present invention will be disclosed, wherein, as usual, like features already described with reference to previous figures are identified by like reference numerals.

Figure 4:
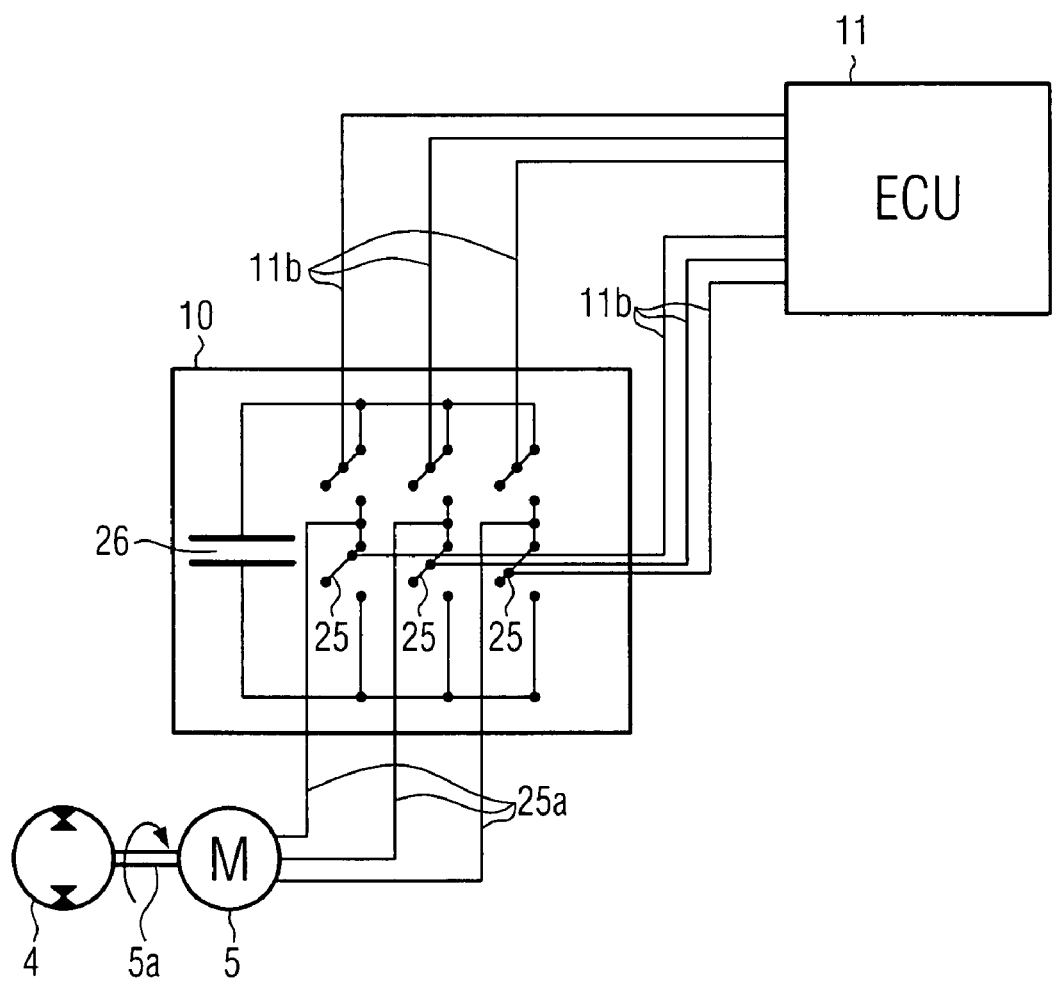
FIG. 4 relates to a schematic view of the electrical layout of further electrical power generating and absorbing means adapted to be implemented in the suspension system or module according to the present invention.

As apparent from FIG. 4, the power electronic unit 10 comprises a plurality of switching devices 25 connected in parallel and a capacitor bank 26 also connected in parallel with the plurality of switching devices 25. In the particular embodiment depicted in FIG. 4, each switching device 25 comprises two switching means connected in series. For instance, the switching means may comprise IGBTs transistors, bipolar transistors, mosfet transistors or the like. The functioning of the switching devices 25, in particular, the functioning of the switching means is controlled by the electronic control unit 11 through connecting lines 11b, through which each single switching means may be activated, i.e. switched on or switched off. Moreover, each switching device 25 of the power electronic unit 10 is connected through connecting lines 25a to the electric motor 5 which is, in turn, mechanically connected and/or coupled with the hydraulic machine or pump 4.

The functioning of the module depicted in FIG. 4 may be summarized as follows. As soon as the need arises for collecting electrical power from the electric motor 5, for instance due to particular driving conditions and/or behavior of the vehicle sensed by sensing means provided to this end, for instance incorporated in the electronic control unit 11, the switching means 25 of the power electronic unit 10 are switched on as a result of signals supplied by the electronic control unit 11 to the power electronic unit 10 through the connecting lines 11b. This results in a direct current being generated and the capacitor bank 26 being loaded, accordingly, so that an electrical voltage is generated at both ends of the capacitor bank 26. This voltage can be used to generate a corresponding current which could in turn be dissipated by means of dissipating means such as, for instance a resistor. The duty cycle, the amount of time the switch is on or off relative to the period, may be controlled by the electronic control unit 11. In particular, the duty cycle may be increased or decreased according to the circumstances. Increasing the duty cycle results in more electrical current being absorbed by the power electronic unit 10 and therefore, in an increased torque being exerted by the motor against the rotational motion of the rotor of the motor 5. Accordingly, a corresponding increased resistance is exerted against the rotational motion of the hydraulic pump 4 and the reciprocating motion of the hydraulic cylinder 2 of FIG. 1 so that the reciprocating speed of this hydraulic cylinder 2 is decreased. In the same way, decreasing the duty cycle at which the switching devices or means 25 are switched on and off results in less electrical current or power being absorbed by the power electronic unit 10. Accordingly, less frictional torque is exerted by the motor 5 against the rotational motion of its rotor. Accordingly, less resistance is exerted against rotation of the hydraulic pump 5, resulting in the stiffness of the hydraulic cylinder 2 of FIG. 1 being decreased.

The electrical layout disclosed above with reference to FIG. 4 has been revealed to be particularly advantageous in the case of three phases electric motors working with alternate current. However, the same working principle may be applied in the case of other solutions or embodiments, such as, for example, monophase motors working with direct current. In the same way, a different number of switching devices and/or switching means may be used according to the circumstances.

In the following, with reference to FIG. 2a, a further embodiment of the suspension system or module according to the present invention will be disclosed; again, in FIG. 2a, like features already described with reference to previous figures are identified by like reference numerals.

Figure 2A:
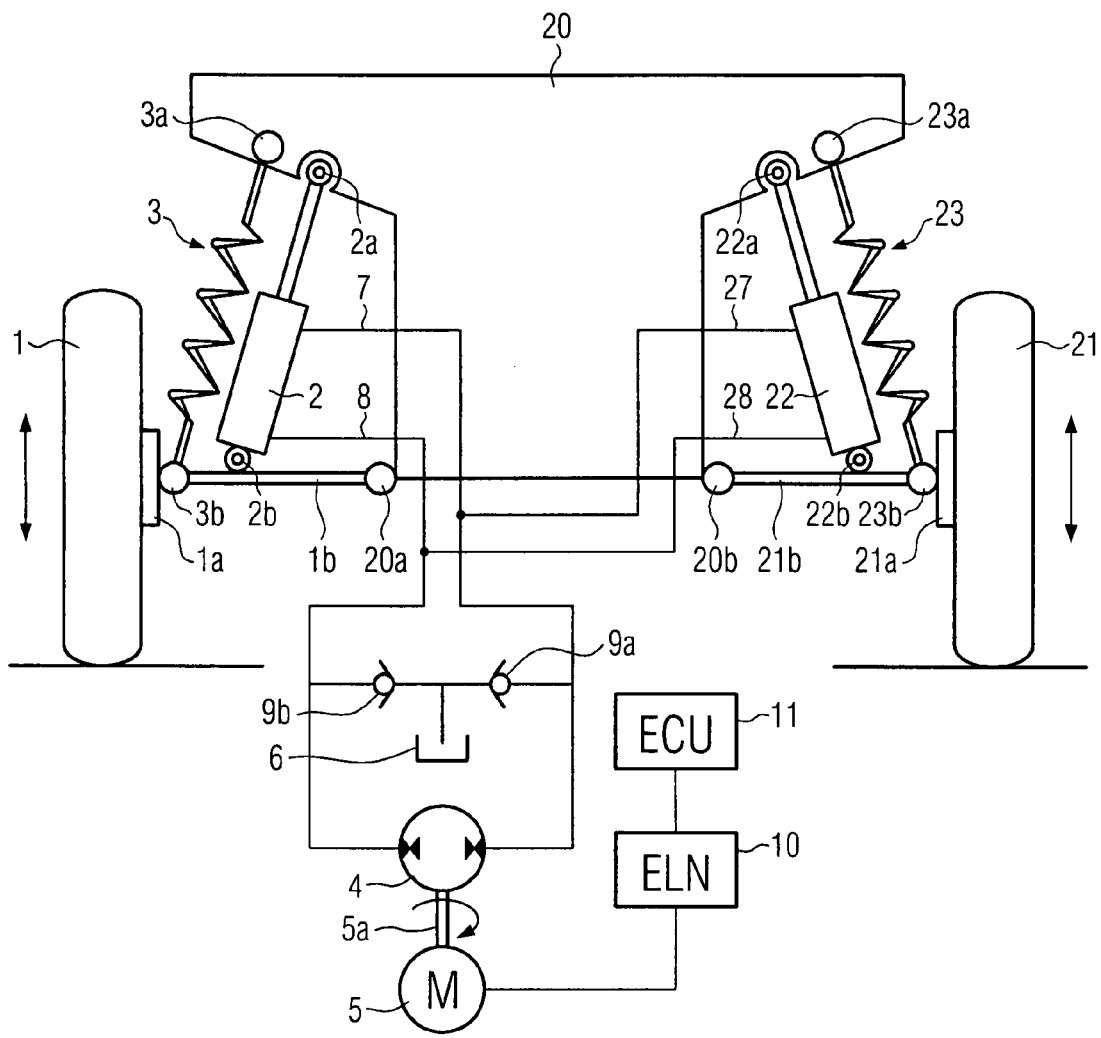
FIG. 2a relates to a schematic view of a further embodiment of the suspension system or module according to the present invention.

The most important difference between the embodiment of FIG. 2a and that of FIG. 1 relates to the fact that the embodiment of FIG. 2a is adapted to be implemented in a vehicle 20 comprising at least two wheels, such as, for instance two wheels disposed on a common axle. In particular, these two wheels may be either the rear or the front wheels of a vehicle.

As apparent from FIG. 2a, the wheel 21 on the right side of the Fig. is pivotally connected to the chassis of the vehicle 20 through a suspension arm 21b (for instance a wishbone suspension arm) and a corresponding pivotable connection 20b so that the wheel 21 is free to be reciprocated up and down in the direction (substantially vertical) of the arrows in FIG. 2a. Moreover, a further spring 23 is interposed between the chassis of the vehicle 20 and the suspension arm 21b; in particular, a first end portion of the spring 23 is pivotally connected to the chassis of the vehicle 20 through a pivotable connection 23a whilst the second end portion of the spring 23 (opposed to said first end portion) is pivotally connected to the suspension arm 21b through a pivotable connection 23b. In the same way, a second shock absorbing device (for instance, an hydraulic cylinder) 22 is interposed between the chassis of the vehicle 20 and the suspension arm 21b; in particular, as apparent from FIG. 2a, a first end portion of the shock absorbing device 22 is pivotally connected to the chassis of the vehicle through a pivotable connection 22a whilst the second end portion of said shock absorbing device 22 (opposed to said first end portion) is pivotally connected to the suspension arm 21b through a pivotable connection 22b. A driving motor, for instance an electric driving motor 21a may be received in the hub of the wheel 21 so as to provide the mechanical torque needed to drive said wheel 21 while the wheel 1 may be driven by a corresponding driving motor 1a. However, as stated above, the vehicle 20 may also be driven by a main engine, not depicted in FIG. 2a, for instance a combustion engine. The shock absorbing device 22 is in fluid connection, for instance hydraulically connected, through pipes 27 and 28 with the hydraulic circuit comprising a hydraulic machine 4 and eventually check valves 9a and 9b and a fluid reservoir 6. In particular, as apparent from FIG. 2a, the output of the shock absorbing device 22 is connected to the input of the hydraulic machine 4, while the input of the shock absorbing device 22 is connected to the output of the hydraulic machine 4. No control valves are provided between the shock absorbing devices 2 and 22 and the hydraulic machine 4 meaning that the link between the shock absorbing devices 2 and 22 and the hydraulic machine 4 is a direct link.

The operation of the suspension system depicted in FIG. 2a may be summarized as follows wherein, for the sake of convenience, it is assumed again that two hydraulic cylinders 2 and 22 are provided as shock absorbing devices while a hydraulic pump 4 is provided, mechanically linked to an electric motor 5 which is in turn driven and/or controlled by a power electronic unit 10 in combination with an electronic control unit 11. However, as stated in the case of the embodiment depicted in FIG. 1, other solutions are also possible in light of the present invention such as, for instance pneumatic cylinders as well as other fluid machines. In the same way, other solutions may be provided for generating electrical current or power instead of an electric motor.

Since, as apparent form FIG. 2a, a single hydraulic pump or fluid machine 4 and a single electric motor 5 are provided, with the hydraulic pump 4 being hydraulically connected to both hydraulic cylinders 2 and 22 it results that the damping functions, the stiffness, of both hydraulic cylinders 2 and 22 are simultaneously controlled by controlling the absorption of the electrical power or current generated by the electric motor 5, when actuated by the hydraulic pump 4 as a result of the reciprocating motion of one of the two wheels 1 and 21. Accordingly, the same damping function is obtained for the two hydraulic cylinders 2 and 22 by varying the absorption of the electrical current or power generated by the electric motor 5 under the control of the power electronic unit 10 and the electronic control unit 11. That means that with the embodiment of FIG. 2a, a dependent "interconnected" suspension system is obtained. Of course, each one of the solutions depicted in FIGS. 3a, 3b and 4 is adapted to be implemented in the case of the suspension system in FIG. 2b, so that the considerations put forward with respect to the implementation of these solutions in the embodiment of FIG. 1 also apply when these solutions are implemented in the embodiment of FIG. 2a.

In some circumstances and/or for some special vehicles, it may be convenient to provide a suspension system wherein the behavior of each single wheel is not influenced by any of the other wheels. This suspension system will be referred to in the following disclosure as an "independent" suspension system, an example of which will be described in the following with reference to FIG. 2b.

Figure 2B:
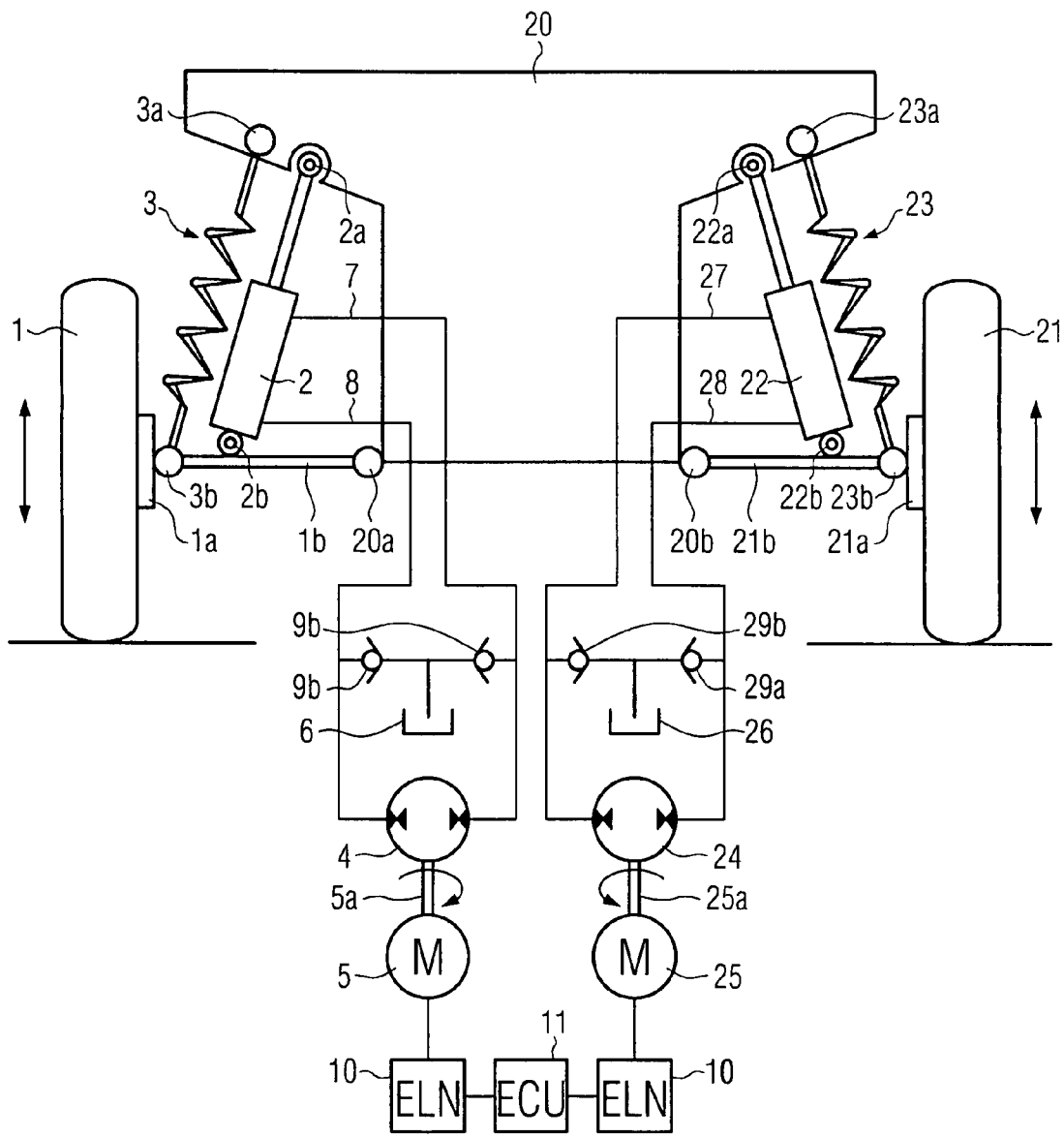
FIG. 2b relates to a schematic view of a further embodiment of the suspension system or module according to the present invention.

The most important difference between the embodiment of FIG. 2b and that of FIG. 2a relates to the fact that, in the embodiment of FIG. 2b two independent and separate electromechanical circuits are provided. In particular, as apparent from FIG. 2b, each one of the two shock absorbing devices 2 and 22 is in fluid connection with a corresponding fluid machine 4 and 24, mechanically coupled to corresponding electrical power generating means 5 and 25. While different kinds of shock absorbing devices, as well as fluid machines and power generating means may be provided, the operation of the embodiment depicted in FIG. 2b will be described in the following, assuming once again that hydraulic cylinders are provided as shock absorbing devices, that hydraulic pumps are provided hydraulically connected to the hydraulic cylinders and that electrical motors are provided as electrical current or power generating means. While the component parts depicted in the left side of FIG. 2b have already been disclosed and described with reference to FIG. 2a so that no further additional comments are needed concerning these component parts, it may be said at present that an additional hydraulic circuit is provided in this case comprising an additional fluid machine or hydraulic pump 24 hydraulically connected to the hydraulic cylinder or shock absorbing device 22 through hydraulic pipes 27 and 28. Moreover, the second hydraulic pump 24 is mechanically coupled to a second electric motor 25 through connection 25a. Finally, additional check valves 29a and 29b are provided between the pipes 27 and 28 as well as an additional reservoir 26 for hydraulic fluid flowing through the pipes 27 and 28. The operation of the electric motors 5 and 25 are controlled by an electronic control unit 11 through two corresponding power electronic units 10. In a device similar to the embodiments depicted in FIGS. 1 and 2a, controlling the operation of the electric motors 5 and 25 through the electronic control unit 11 means that, the absorption of the electrical current or power generated by the two electric motors 5 and 25 is controlled by the electronic control unit 11. To this end, each one of the solutions depicted in FIGS. 3a, 3b and 4 may be implemented in the embodiment depicted in FIG. 2b.

The most important aspect of the embodiment depicted in FIG. 2b relates to the fact that the two motors 5 and 25 may be controlled separately. In particular, that means that the absorption or dissipation of the electrical current or power generated by the two motors or electric power generating means 5 and 25 may be varied separately under the control of the unique electronic control unit 11, for instance in combination with power electronic units 10, as depicted in FIG. 4, or with variable resistors of the kind depicted in FIGS. 3a and 3b. The damping function of each of the two hydraulic cylinders 2 and 22 depends, therefore, on the absorption of the electrical current generated by the electric motors 5 and 25. In particular, the damping function of the hydraulic cylinder 2 may be varied by varying the absorption of electrical current from the electric motor 5, while the damping function of the hydraulic cylinder 22 may be varied by varying the absorption of electrical current or power from the electric motor 25. Since the absorption of electrical current from each of the two motors 5 and 25 may be varied and/or controlled separately, the damping function of the two hydraulic cylinders 2 and 22 may also be varied separately. That means that with the embodiment depicted in FIG. 2b, an independent suspension system may be realized, wherein the behavior of each wheel is not influenced by the behavior of any other wheel. Of course, the working principle of the embodiment depicted in FIG. 2b may also be used for realizing a suspension system adapted to support more than two wheels, with each of these wheels behaving independently. To this end, it is sufficient that for each wheel, a corresponding fluid or hydraulic system be provided, with said corresponding fluid or hydraulic system comprising at least a fluid or hydraulic machine and electrical current generating means, an electric motor, adapted to be actuated by the fluid or hydraulic machine.

In conclusion, it results from the disclosure given above that the suspension system according to the present invention allows overcoming, at least partially, the problems affecting the prior art suspension systems. In particular, the suspension system according to the present invention allows varying the damping value or the stiffness of its shock absorbing devices. Moreover, to this end, neither check valves nor hydraulic controls are needed. This, in particular, allows reducing the complexity of the suspension system and rendering the same quite cheaply and, therefore, adapted to be implemented in any kind of car and not only in high performance cars. The suspension system according to the present invention also allows better optimization of the layout of the overall vehicle, since less space is needed. Moreover, the control of the damping function can be made directly by controlling the absorption of electrical current or power, for instance by controlling the resistances shunted to the electric motors. Moreover, the control of the damping function may be exploited separately for each shock absorbing device (i.e. for each wheel) or, alternatively, the damping function of two or more shock absorbing devices may be exploited contemporarily. Accordingly, either independent, semi-dependent, or interconnected suspension systems may be realized. There is also no need for mechanical links between the electric motor and the shock absorbing device, so that the electric motor and the fluid machine or the hydraulic pump can be positioned with the best orientation in order to optimize packaging. The overall mass of the suspension system is less than that of a purely mechanical suspension system. Finally, the suspension system according to the present invention has less friction than a purely mechanical suspension system. It is also possible to make the suspension system according to the present invention work in an active or regenerative mode using the motor as an actuator, the fluid or hydraulic machine working as a pump so as to apply a force to the shock absorbing devices.

Of course, it should be understood that a wide range of changes and modifications can be made to the embodiments described above without departing from the scope of the present invention. It has, therefore, to be understood that the scope of the present invention is not limited to the embodiments described but is defined by the appended claims.

What is claimed is:

1. A suspension system for a wheeled vehicle, the suspension system being adapted to support at least one wheel of the wheeled vehicle and comprising:
   at least one shock absorbing device adapted to be activated as a result of the motion of the at least one wheel in a substantially vertical direction;
   electrical power generating means in fluid connection with said at least one shock absorbing device so that the activation of said at least one shock absorbing device results in electrical power being generated,
   said electrical power generating means further comprise at least one electrical motor adapted to be activated as a result of the activation of said at least one shock absorbing device,
   said means for absorbing at least partially the electrical power generated comprise at least one power electronic unit, and
   wherein said at least one power electronic unit comprises a plurality of switching devices electrically connected in parallel.

2. A suspension system as claimed in claim 1, wherein:
   said power electronic unit further comprises at least one capacitor pack connected in parallel with said plurality of switching devices.

3. A suspension system as claimed in claim 1, wherein:
   said plurality of switching devices comprises a plurality of transistors.

4. A suspension system as claimed in 3, wherein:
said plurality of transistors comprises a transistor selected from the group consisting of a bipolar transistor, a IGBTs transistor, and a mosfet transistor.

5. A suspension system as claimed in claim 1, wherein:
said at least one electric motor is adapted to be electrically activated, and in that electrical activation of said at least one electric motor results in said at least one shock absorbing device being activated through said at least one electric motor.

6. A suspension system as claimed in claim 5, further comprising:
means for controlling the electrical activation of said at least one motor.

7. A suspension system as claimed in claim 6, wherein:
said means for controlling the electrical activation of said at least one motor comprise means for controlling the electrical power supplied to said at least one electric motor.

8. A wheeled vehicle comprising:
at least one wheel;
at least one shock absorbing device adapted to be activated as a result of the motion of said at least one wheel in a substantially vertical direction;
electrical power generating means in fluid connection with said at least one shock absorbing device;
a power electronic unit coupled to said electrical power generating means comprising a plurality of switches electrically connected in parallel wherein each single switch of said plurality of switches may be activated,
a control unit coupled to said power electronic unit capable of selectively activating each of the plurality of switches,
whereby activation of said at least one shock absorbing device results in electrical power being selectively generated.

9. A wheeled vehicle as claimed in claim 8, further comprising:
a second wheel;
a second shock absorbing device adapted to be activated as a result of the motion of said second wheel in a substantially vertical direction; and
a second electrical power generating means in fluid connection with said second shock absorbing device so that the activation of said second shock absorbing device results in electrical power being generated.

10. A wheeled vehicle as claimed in claim 9, further comprising:
a third wheel;
a third shock absorbing device adapted to be activated as a result of the motion of said third wheel in a substantially vertical direction;
a third electrical power generating means in fluid connection with said third shock absorbing device so that the activation of said third shock absorbing device results in electrical power being generated;
a fourth wheel;
a fourth shock absorbing device adapted to be activated as a result of the motion of said fourth wheel in a substantially vertical direction; and
a fourth electrical power generating means in fluid connection with said fourth shock absorbing device so that the activation of said fourth shock absorbing device results in electrical power being generated.

11. A suspension system for a vehicle having a wheel comprising:
a shock absorber coupled to the vehicle and the wheel;
a fluid machine coupled to said shock absorber, whereby said fluid machine is powered by displacement of said shock absorber;
an electrical power device coupled to said fluid machine, whereby movement of said fluid machine is converted into electricity;
a power electronic unit coupled to said electrical power device comprising a plurality of switches electrically connected in parallel wherein each single switch of said plurality of switches may be activated;
a control unit coupled to said power electronic unit capable of selectively activating each of the plurality of switches placing a load on said electrical power device,
whereby the degree of dampening of said shock absorber is capable of being controlled.

* * * * *